(12) United States Patent
Brickner

(10) Patent No.: US 8,096,227 B2
(45) Date of Patent: Jan. 17, 2012

(54) HYDRAULIC SYSTEM HAVING REGENERATION MODULATION

(75) Inventor: Chad Timothy Brickner, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 840 days.

(21) Appl. No.: 12/219,819

(22) Filed: Jul. 29, 2008

(65) Prior Publication Data

US 2010/0024410 A1 Feb. 4, 2010

(51) Int. Cl.
*F15B 11/024* (2006.01)
(52) U.S. Cl. ............................ 91/436; 91/454
(58) Field of Classification Search .............. 91/436, 91/454

See application file for complete search history.

(56) References Cited

U.S. PATENT DOCUMENTS

| | | | |
|---|---|---|---|
| 3,954,046 A | 5/1976 | Stillhard | |
| 3,965,587 A | 6/1976 | Johns, Jr. | |
| 5,682,742 A | 11/1997 | Sato et al. | |
| 6,467,264 B1 | 10/2002 | Stephenson et al. | |
| 6,655,136 B2 | 12/2003 | Holt et al. | |
| 6,691,604 B1 | 2/2004 | Hajek, Jr. et al. | |
| 6,699,311 B2 | 3/2004 | Smith et al. | |
| 6,779,340 B2 | 8/2004 | Pfaff et al. | |
| 6,837,140 B2 | 1/2005 | Oka et al. | |
| 6,871,575 B2 | 3/2005 | Korogi | |
| 6,880,332 B2 * | 4/2005 | Pfaff et al. | 91/454 |
| 7,028,599 B2 | 4/2006 | Linser | |
| 7,251,935 B2 | 8/2007 | Zhang et al. | |
| 7,380,398 B2 | 6/2008 | Pfaff | |
| 2006/0201146 A1 | 9/2006 | Tabor | |
| 2008/0072749 A1 | 3/2008 | Pfaff et al. | |

* cited by examiner

*Primary Examiner* — Daniel Lopez
(74) *Attorney, Agent, or Firm* — Finnegan, Henderson, Farabow, Garrett & Dunner LLP

(57) ABSTRACT

A hydraulic system for a machine is disclosed. The hydraulic system may have an actuator with a first chamber and a second chamber. The hydraulic system may also have a first valve, a second valve, a third valve, and an operator input device displaceable from a neutral position to generate a signal indicative of a desired movement of the actuator. The hydraulic system may further have a controller configured to open the first and third valves by amounts related to the signal to pass fluid, and open the second valve by an amount related to the signal to pass fluid when the signal indicates a desire for increased actuator velocity. The third valve may continue to open during opening of the second valve.

20 Claims, 3 Drawing Sheets

HYDRAULIC SYSTEM HAVING REGENERATION MODULATION

TECHNICAL FIELD

The present disclosure relates generally to a hydraulic system, and more particularly, to a hydraulic system having regeneration modulation.

BACKGROUND

Hydraulic machines such as, for example, dozers, loaders, excavators, motor graders, and other types of heavy equipment use one or more hydraulic actuators to accomplish a variety of tasks. These actuators are fluidly connected to a pump of the machine that provides pressurized fluid to chambers within the actuators. As the pressurized fluid moves into or through the chambers, the pressure of the fluid acts on hydraulic surfaces of the chambers to affect movement of the actuators and a connected work tool. When the pressurized fluid is drained from the chambers it is returned to a low pressure sump of the machine.

One problem associated with this type of hydraulic arrangement involves efficiency. In particular, the fluid draining from the actuator chambers to the sump often has a pressure greater than a pressure of the fluid already within the sump, especially when the actuators are moving in a direction aligned with the pull of gravity (i.e., when actuator movement is being assisted by a weight of the tool and associated load). As a result, the higher pressure fluid draining into the sump still contains some energy that is wasted upon entering the low pressure sump. This wasted energy reduces the efficiency of the hydraulic system.

One method of improving the efficiency of hydraulic machine is described in U.S. Pat. No. 6,467,264 (the '264 patent) issued to Stephenson et al. on Oct. 22, 2002. The '264 patent describes a hydraulic system having a cylinder containing a piston that is connected by a rod to drive a load. The piston divides an internal cavity of the cylinder into a head chamber and a rod chamber, both of which are connected to an array of four bidirectional, proportional control valves. A first control valve controls the flow of hydraulic fluid from a pump to the head chamber. A second control valve regulates the flow of hydraulic fluid between the head chamber and a return line. A third control valve governs the flow of hydraulic fluid from the pump to the rod chamber, and a fourth control valve controls the flow of hydraulic fluid between the rod chamber and the return line. By simultaneously operating different combinations of the control valves, hydraulic fluid from the pump can be applied to one of the cylinder chambers and exhaust to the return line from the other chamber to drive the piston and connected load in one of two directions.

Several modes of operation of the hydraulic system described above are disclosed in the '264 patent, including a regenerative mode of operation. In the regenerative mode of operation, the load acting on the piston tends to extend the rod from the cylinder due to gravity acting on the load. In this mode, the third valve is opened to regulate a reverse flow of fluid exhausting from the rod chamber and control the rate at which the load drops, and the first control valve is opened to meter the flow of fluid into the head chamber. The second and fourth control valves are closed during this mode of operation. Although little or no energy from the pump needs to be exerted to lower the load, additional fluid is still required to fill the expanding head chamber. And, if all of the fluid were provided by only the pump, energy would be wasted in the pressurizing of that fluid. In addition, if the fluid from within the rod chamber were simply exhausted to the return line, energy within that fluid would also be wasted. Thus, the simultaneous opening of the first and third control valves allows fluid from both the rod chamber and the pump to enter the head chamber and help prevent cavitation. Additional modes of regeneration are similarly described in the '264 patent.

Although the '264 patent disclosed operational modes that may help increase machine efficiency, the disclosed modes may be less than optimal. That is, the on/off approach to initiating regeneration (i.e., the opening/closing operations of the valves described above) may result in poor system modulation and jerky response.

The disclosed hydraulic system is directed to overcoming one or more of the problems set forth above and/or other problems of the prior art.

SUMMARY

In one aspect, the present disclosure is directed to a hydraulic system. The hydraulic system may include a tank configured to hold a supply of fluid, a pump configured to pressurize fluid, and an actuator having a first chamber and a second chamber. The hydraulic system may also include a first valve fluidly connected between the pump and the first chamber, a second valve fluidly connected between the pump and the second chamber, and a third valve fluidly connected between the second chamber and the tank. The hydraulic system may further include an operator input device displaceable from a neutral position to generate a signal indicative of a desired movement of the actuator, and a controller in communication with the first valve, the second valve, the third valve, and the operator input device. The controller may be configured to open the first and third valves by amounts related to the signal to pass fluid, and open the second valve by an amount related to the signal to pass fluid when the signal indicates a desire for increased actuator velocity. The third valve may continue to open during opening of the second valve.

In another aspect, the present disclosure is directed to a method of operating a hydraulic actuator. The method may include receiving a first operator input indicative of a desire to move the hydraulic actuator, directing pressurized fluid into a first chamber of the hydraulic actuator in response to the first operator input, and directing fluid from a second chamber of the hydraulic actuator to a low pressure reservoir in response to the operator input. The method may further include receiving a second operator input indicative of a desire to move the hydraulic actuator at an increased velocity, increasing a rate of fluid flow into the first chamber and out of the second chamber to the low pressure reservoir in response to the second operator input, and directing fluid from the second chamber of the hydraulic actuator to the first chamber of the hydraulic actuator in response to the second operator input. A flow rate of fluid being directed from the second chamber of the hydraulic actuator to the low pressure reservoir may be increasing when fluid from the second chamber of the hydraulic actuator is being directed to the first chamber.

DETAILED DESCRIPTION

Figure 1:
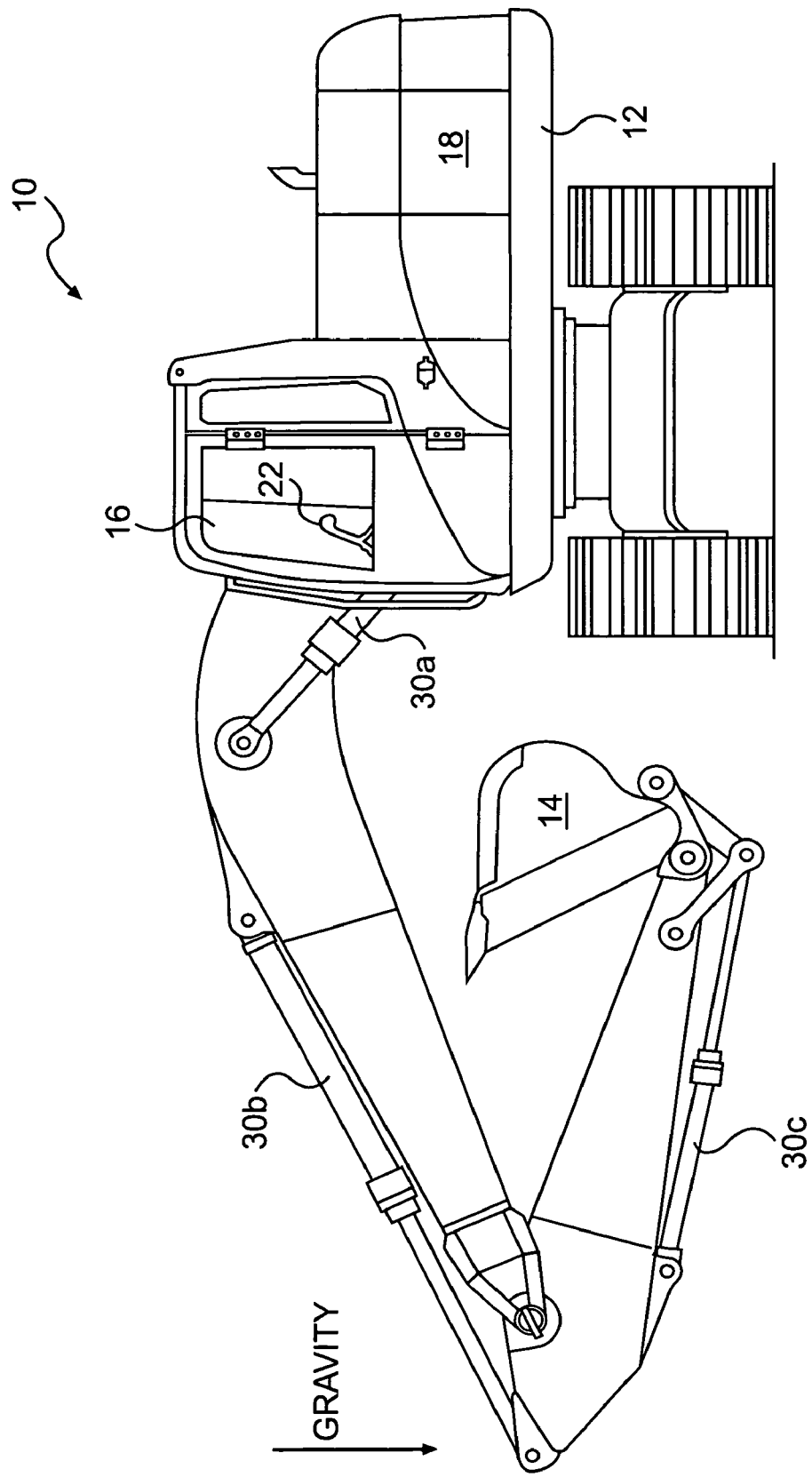
FIG. 1 is a diagrammatic illustration of an exemplary disclosed power system.

FIG. 1 illustrates an exemplary power system 10 having multiple components that cooperate to accomplish a task. Power system 10 may be a fixed or mobile machine that performs some type of operation associated with an industry such as mining, construction, farming, transportation, or any other industry known in the art. For example, power system 10 may be an earth moving machine such as an excavator, a front shovel, a dozer, a loader, a backhoe, a motor grader, a dump truck, or any other earth moving machine. Power system 10 may include a frame 12, a work tool 14, one or more hydraulic actuators 30a, 30b, 30c operatively connecting work tool 14 to frame 12, an operator station 16 that facilitates manual control of hydraulic actuators 30a-c, and a power source 18 that drives hydraulic actuators 30a-c.

Frame 12 may include any structural unit that supports movement of power system 10. Frame 12 may embody, for example, a stationary base frame connecting power source 18 to a traction device, a movable frame member of a linkage system, or any other frame known in the art.

Numerous different work tools 14 may be attachable to a frame 12 and controllable via operator station 16. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Work tool 14 may be connected to power system 10 via a direct pivot, via a linkage system, via one or more hydraulic cylinders, via a motor, or in any other appropriate manner. Work tool 14 may be configured to pivot, rotate, slide, swing, lift, or move relative to power system 10 in any manner known in the art.

Operator station 16 may be configured to receive input from a machine operator indicative of a desired work tool movement. Specifically, operator station 16 may include one or more operator interface devices 22 embodied as single or multi-axis joysticks or levers located proximal an operator seat. Each operator interface device 22 may be a proportional-type controller displaceable through a range from a neutral position toward a maximum displaced position to indicate a desired position, orientation, force, and/or velocity of work tool 14 and to produce a corresponding position signal. It is contemplated that additional and/or different operator interface devices may be included within operator station 16 such as, for example, wheels, knobs, push-pull devices, switches, pedals, and other operator interface devices known in the art.

Power source 18 may embody an engine such as, for example, a diesel engine, a gasoline engine, a gaseous fuel-powered engine, or any other type of engine known in the art. It is contemplated that power source 18 may alternatively embody a non-combustion source of power such as a fuel cell, a power storage device, an electric or hydraulic motor, or another source of power known in the art.

Figure 2:
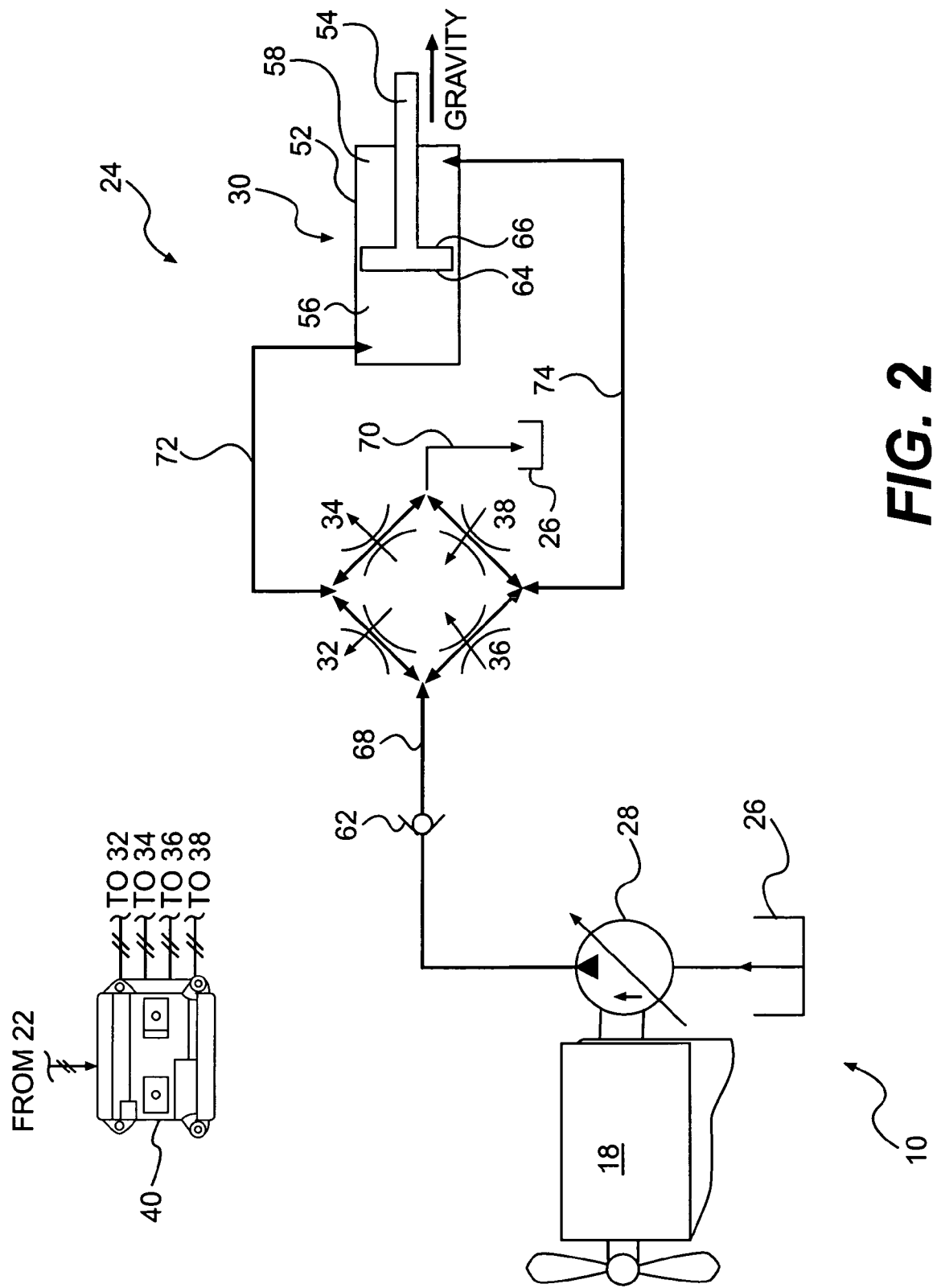
FIG. 2 is a schematic illustration of an exemplary disclosed hydraulic system that may be used with the power system of FIG. 1.

As illustrated in FIG. 2, power system 10 may include a hydraulic system 24 having a plurality of fluid components driven by power source 18 to move work tool 14 (referring to FIG. 1). Specifically, hydraulic system 24 may include a tank 26 holding a supply of fluid, and a source 28 configured to pressurize the fluid and direct the pressurized fluid to hydraulic actuators 30a-c. Hydraulic system 24 may also include a head-end supply valve 32, a head-end drain valve 34, a rod-end supply valve 36, and a rod-end drain valve 38 located between hydraulic actuators 30a-c and tank 26 and source 28 to regulate flows of fluid therebetween. Hydraulic system 24 may further include a controller 40 in communication with the fluid components of hydraulic system 24 to control operation of head- and rod-end supply and drain valves 32-38. It is contemplated that hydraulic system 24 may include additional and/or different components such as, for example, pressure compensators, accumulators, restrictive orifices, pressure relief valves, makeup valves, pressure-balancing passageways, temperature sensors, pressure sensors, accelerometers, position sensors, and other such components known in the art, if desired.

Tank 26 may constitute a reservoir configured to hold a supply of fluid. The fluid may include, for example, a dedicated hydraulic oil, an engine lubrication oil, a transmission lubrication oil, or any other fluid known in the art. One or more hydraulic systems within power system 10 may draw fluid from and return fluid to tank 26. It is also contemplated that hydraulic system 24 may be connected to multiple separate fluid tanks, if desired.

Source 28 may be configured to draw and pressurize fluid from tank 26, and may include a pump such as, for example, a variable-displacement pump; a fixed-displacement, variable delivery pump; a fixed delivery pump; or any other source of pressurized fluid known in the art. Source 28 may be drivably connected to power source 18 of power system 10 by, for example, a countershaft, a belt (not shown), an electrical circuit (not shown), or in any other suitable manner. Alternatively, source 28 may be indirectly connected to power source 18 via a torque converter, a gear box, or in any other manner known in the art. It is contemplated that multiple sources of pressurized fluid may be interconnected to supply pressurized fluid to hydraulic system 24, if desired.

It should be noted that, while FIG. 1 depicts three hydraulic actuators, identified as 30a, 30b, and 30c, for purposes of simplicity, the schematic of FIG. 2 depicts only a single generic hydraulic actuator labeled as element 30. Thus, while all description of hydraulic system 24 will be with reference to only hydraulic actuator 30, the description may be equally applicable to any one of hydraulic actuators 30a-c. In addition, the description of hydraulic actuator 30 may be just as applicable to a swing or traction actuator (not shown) that functions to swing frame 12 or propel power system 10, or to any other suitable hydraulic actuator.

Hydraulic actuator 30 may embody a cylinder that connects work tool 14 to frame 12 (referring to FIG. 1) via a direct pivot, via a linkage system with hydraulic actuator 30 forming a member in the linkage system, or in any other appropriate manner. As illustrated in FIG. 2, hydraulic actuator 30 may include a tube 52 and a piston assembly 54 (or other load bearing member) disposed within tube 52. One of tube 52 and piston assembly 54 may be pivotally connected to frame 12, while the other of tube 52 and piston assembly 54 may be pivotally connected to work tool 14. It is contemplated that tube 52 and/or piston assembly 54 may alternatively be fixedly connected to either frame 12 or work tool 14. Tube 52 may be separated by piston assembly 54 to at least partially define a first or head-end chamber 56 and a second or rod-end chamber 58. First and second chambers 56, 58 may be selectively supplied with pressurized fluid from source 28 and selectively connected with tank 26 to cause piston assembly 54 to displace within tube 52, thereby changing an effective length of hydraulic actuator 30. The expansion and retraction of hydraulic actuator 30 may function to assist in moving work tool 14.

Piston assembly 54 may include a first hydraulic surface 64 and a second hydraulic surface 66 disposed opposite first hydraulic surface 64. An imbalance of force caused by fluid pressure acting on first and second hydraulic surfaces 64, 66 may result in movement of piston assembly 54 within tube 52. For example, a force on first hydraulic surface 64 being greater than a force on second hydraulic surface 66 may cause piston assembly 54 to displace to increase the effective length of hydraulic actuator 30 (i.e., to extend hydraulic actuator 30). Similarly, when a force on second hydraulic surface 66 is greater than a force on first hydraulic surface 64, piston assembly 54 may retract within tube 52 to decrease the effective length of hydraulic actuator 30. A flow rate of fluid into and out of first and second chambers 56 and 58 may relate to a velocity of hydraulic actuator 30, while a pressure of the fluid in contact with first and second hydraulic surfaces 64 and 66 may relate to an actuation force of hydraulic actuator 30.

Head-end supply valve 32 may be fluidly disposed between source 28 and first chamber 56 and configured to regulate a flow of pressurized fluid to first chamber 56 in response to a extension velocity or position command from controller 40. Specifically, head-end supply valve 32 may include a proportional spring-biased valve mechanism that is solenoid-actuated and configured to move between a first or open position, at which fluid is allowed to flow into first chamber 56, and a second or closed position, at which fluid flow is substantially blocked from first chamber 56. Head-end supply valve 32 may be movable to any position between the first and second positions to vary a rate of fluid flow into first chamber 56, thereby affecting the extension velocity of hydraulic actuator 30. It is contemplated that head-end supply valve 32 may alternatively be hydraulically-actuated, mechanically-actuated, pneumatically-actuated, or actuated in any other suitable manner. It is further contemplated that head-end supply valve 32 may be configured to allow fluid from first chamber 56 to flow through head-end supply valve 32 during a regeneration event when a pressure within first chamber 56 exceeds a pressure within head-end supply valve 32. For the purposes of this disclosure, a regeneration event may include operations where pressurized fluid from the draining one of first and second chambers 56, 58 may be redirected to the filling one of first and second chambers 56, 58 and reused as a portion of the total flow into the filling chamber.

Head-end drain valve 34 may be fluidly disposed between first chamber 56 and tank 26 and configured to regulate a fluid flow from first chamber 56 to tank 26 in response to a pressure or position command from controller 40 during a retraction operation. Specifically, head-end drain valve 34 may include a proportional spring-biased valve mechanism that is solenoid-actuated and configured to move between a first or open position, at which fluid is allowed to flow from first chamber 56, and a second or closed position, at which fluid is substantially blocked from flowing from first chamber 56. Head-end drain valve 34 may be movable to any position between the first and second positions to vary a pressure of the fluid within first chamber 56. It is contemplated that head-end drain valve 34 may alternatively be hydraulically-actuated, mechanically-actuated, pneumatically-actuated, or actuated in any other suitable manner.

Rod-end supply valve 36 may be fluidly disposed between source 28 and second chamber 58 and configured to regulate a flow of pressurized fluid to second chamber 58 in response to the retraction velocity or position command from controller 40. Specifically, rod-end supply valve 36 may include a proportional spring-biased valve mechanism that is solenoid-actuated and configured to move between a first or open position, at which fluid is allowed to flow into second chamber 58, and a second or closed position, at which fluid is substantially blocked from second chamber 58. Rod-end supply valve 36 may be movable to any position between the first and second positions to vary a rate of fluid flow into second chamber 58, thereby affecting the retraction velocity of hydraulic actuator 30. It is contemplated that rod-end supply valve 36 may alternatively be hydraulically-actuated, mechanically-actuated, pneumatically-actuated, or actuated in any other suitable manner. It is further contemplated that rod-end supply valve 36 may be configured to allow fluid from second chamber 58 to flow through rod-end supply valve 36 during a regeneration event when a pressure within second chamber 58 exceeds a pressure within rod-end supply valve 36.

Rod-end drain valve 38 may be fluidly disposed between second chamber 58 and tank 26 and configured to regulate a fluid flow from second chamber 58 to tank 26 in response to a pressure or position command from controller 40 during an extension operation. Specifically, rod-end drain valve 38 may include a proportional spring-biased valve mechanism that is solenoid-actuated and configured to move between a first or open position, at which fluid is allowed to flow from second chamber 58, and a second or closed position, at which fluid is substantially blocked from flowing from second chamber 58. Rod-end drain valve 38 may be movable to any position between the first and second positions to vary a pressure of the fluid within second chamber 58. It is contemplated that rod-end drain valve 38 may alternatively be hydraulically-actuated, mechanically-actuated, pneumatically-actuated, or actuated in any other suitable manner.

Head- and rod-end supply and drain valves 32-38 may be fluidly interconnected. In particular, head- and rod-end supply valves 32, 36 may be fluidly connected in parallel to a common supply passageway 68 extending from source 28. A check valve 62 may be disposed within supply passageway 68 to provide for a unidirectional flow of fluid from source 28 to head- and rod-end supply valves 32, 36 (i.e., to inhibit bidirectional flows of fluid through supply passageway 68). Head- and rod-end drain valves 34, 38 may be fluidly connected in parallel to a common drain passageway 70 leading to tank 26. Head-end supply and drain valves 32, 34 may be fluidly connected in parallel to a first or head-end chamber passageway 72 for selectively supplying and draining first chamber 56 in response to the velocity and pressure or position commands from controller 40. Rod-end supply and drain valves 36, 38 may be fluidly connected in parallel to a common second or rod-end chamber passageway 74 for selectively supplying and draining second chamber 58 in response to the velocity and pressure or position commands from controller 40.

It should be understood that references to head-end and rod-end, and associated directional movements of piston assembly 54 caused by filling and draining of head-end and rod-end chambers (first and second chambers 56, 58) refer to the specific orientation and configuration depicted in FIG. 2. One skilled in the art will appreciate, however, that other orientations and configurations can exist in other power systems. For example, although shown in FIG. 2 as an extension of hydraulic actuator 30 being generally in a direction assisted by the pull of gravity, the orientation of hydraulic actuator 30 could be reversed such that a retraction of hydraulic actuator 30 would be generally in the direction assisted by the pull of gravity. It is intended that this disclosure also encompasses those embodiments.

Controller 40 may embody a single microprocessor or multiple microprocessors that include a means for controlling an operation of hydraulic system 24. Numerous commercially available microprocessors can be configured to perform the functions of controller 40. It should be appreciated that controller 40 could readily be embodied in a general power system microprocessor capable of controlling numerous power system functions. Controller 40 may include a memory, a secondary storage device, a processor, and any other components for running an application. Various other circuits may be associated with controller 40 such as power supply circuitry, signal conditioning circuitry, solenoid driver circuitry, and other types of circuitry.

One or more maps relating interface device position, fluid actuator load, command velocity or position, and command pressure or position for hydraulic actuator 30 may be stored in the memory of controller 40. Each of these maps may be in the form of tables, graphs, and/or equations. In one example, interface device position, command velocity, and fluid actuator load may form the coordinate axis of a 3-D table for control of head- and rod-end supply valves 32, 36. Velocity and valve position commands associated with the appropriate supply valve may be related in a separate 2-D map or in another 3-D map, with a measured or assumed inlet pressure as the third input. It is also contemplated that the interface device position signal may be directly related to valve position commands in a single 3-D map, if desired. In the same example, the three axis of another 3-D map stored within the memory of controller 40 may relate load information, commanded velocities or positions of head- and rod-end supply valves 32, 36, and commanded pressures or positions of head- and rod-end drain valves 34, 38. Controller 40 may be configured to allow the operator to directly modify these maps and/or to select specific maps from available relationship maps stored in the memory of controller 40 to affect actuation of hydraulic actuator 30. It is also contemplated that the maps may be automatically selected for use based on operation of power system 10 such as, for example, extension or retraction with resistive or overrunning loads, during transitioning from resistive to overrunning loads, and during other such operations of power system 10.

Resistive modes of operation may include modes of operation during which hydraulic actuator 30 opposes an externally-generated force. Overrunning modes of operation may include modes of operation during which a load on work tool 14 or the mass of work tool 14 itself naturally assists movement of hydraulic actuator 30 in a desired direction.

During operation in the resistive mode, two of head- and rod-end supply and drain valves 32-38 may typically be in the open positions and passing fluid, while the remaining two valves may be in the closed positions. For example, when hydraulic actuator 30 is retracting against the pull of gravity or against another external force (resistive operation), rod-end supply valve 36 may be commanded to move toward the first position to fill second chamber 58 with pressurized fluid at a rate corresponding to an operator desired work tool velocity. Substantially simultaneously, head-end drain valve 34 may be commanded to move toward the first position to allow the fluid from first chamber 56 to drain to tank 26. In this situation, both of head-end supply and rod-end drain valves 32, 38 may be maintained in the second positions to help prevent undesired movement of hydraulic actuator 30. Similarly, when hydraulic actuator 30 is extending against the pull of gravity or another external force (resistive operation), head-end supply and rod-end drain valves 32, 38 may be commanded to the first positions, while head-end drain and rod-end supply valves 34, 36 may be commanded to the second positions.

During an overrunning mode of operation or during resistive extension modes of operation, regeneration may be possible to improve efficiency. That is, during the overrunning mode of operation when hydraulic actuator 30 is extending and being naturally assisted by the load of work tool 14 or by the mass of work tool 14 itself, or during the resistive extension of hydraulic actuator 30 when a pressure within second chamber 58 is greater than a pressure within first chamber 56, rod-end supply valve 36 may be selectively moved toward the first position such that some of the fluid exiting second chamber 58 may be redirected into first chamber 56 and reused. In some situations, rod-end drain valve 38 may be closed to increase the amount of fluid passing from second chamber 58 to first chamber 56 via rod-end supply valve 36 during extension regeneration. Similar operation may be observed when hydraulic actuator 30 is retracting and being naturally assisted by the load of work tool 14 or by the mass of work tool 14 itself. That is, head-end supply valve 32 may be selectively moved toward the first position such that some of the fluid exiting first chamber 56 may be redirected into second chamber 58 and, in some situations, head-end drain valve 34 may be moved to the second position to increase the redirection.

Controller 40 may be configured to receive input from operator interface device 22, and to command operation of head- and rod-end supply and drain valves 32-38 in response to the input and the relationship maps described above. Specifically, controller 40 may be in communication with head- and rod-end supply and drain valves 32-38 of hydraulic actuator 30 and with operator interface device 22 via separate communications lines (truncated in FIG. 2 for clarity). Controller 40 may receive the position signal from operator interface device 22, and reference the selected and/or modified relationship maps stored in the memory of controller 40 to determine corresponding velocity and pressure or position commands. The velocity or position command may cause head-end and rod-end supply valves 32 and 36 to selectively fill the appropriate chamber at a flow rate that results in the desired work tool velocity. The pressure or position command may cause head-end and rod-end drain valves 34 and 38 to selectively drain first and second chambers 56, 58 at a flow rate that results in a desired pressure within the corresponding draining chamber. It is contemplated that all of head- and rod-end supply and drain valves 32-38 may be controlled on the basis of velocity only or pressure only, if desired.

Controller 40 may also be configured to selectively implement regeneration according to a predetermined strategy. Specifically, the open/closed positions of head- and rod-end supply and drain valves 32-38 may be commanded based on a displacement of operator interface device 22 and a current operational mode of hydraulic actuator 30 (i.e., based on which of the resistive extension, resistive retraction, and overrunning modes of operation are occurring). The relationship between interface device position and the positions of head- and rod-end supply and drain valves 32-38 may be contained within the maps stored in the memory of controller 40.

Figure 3:
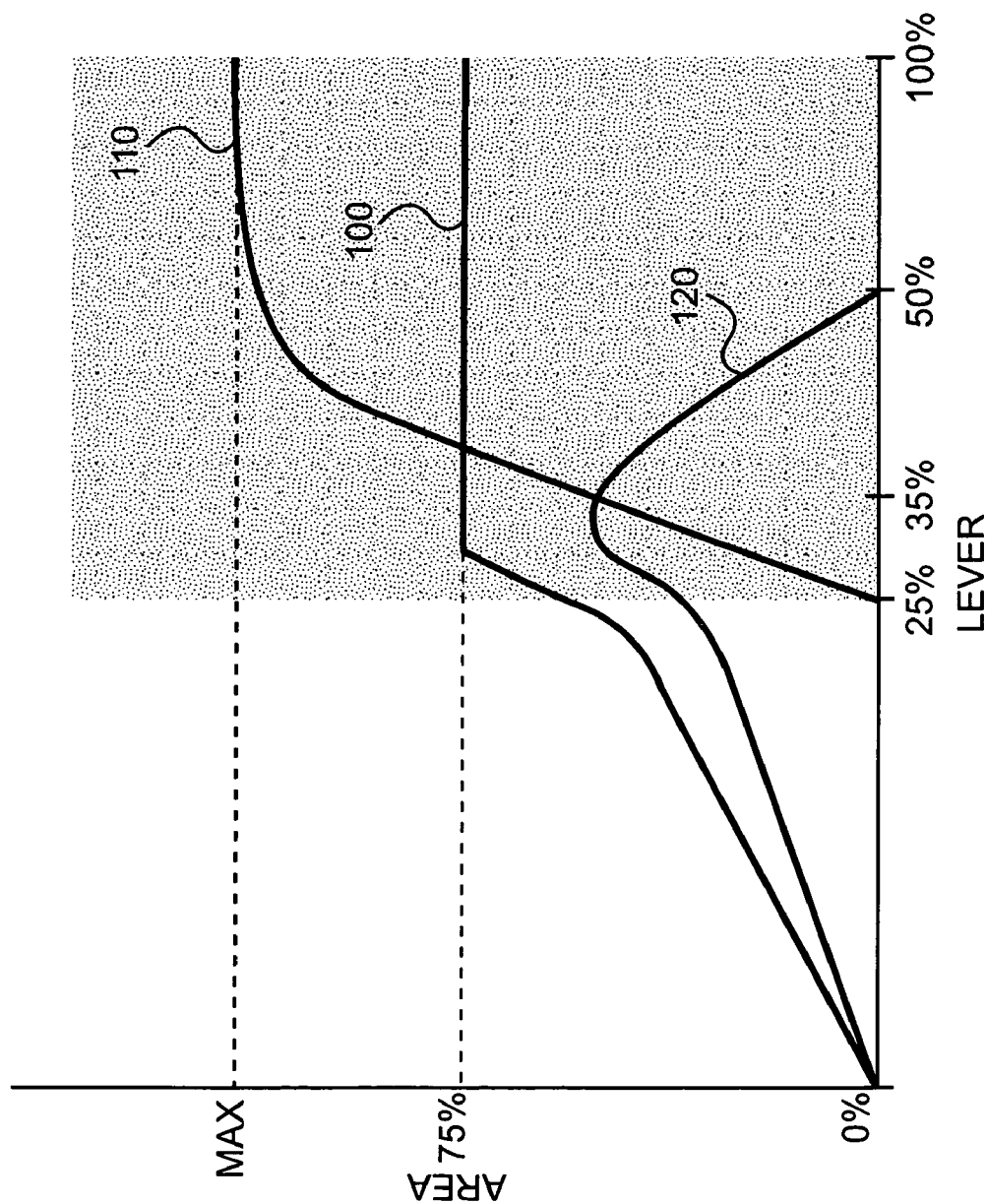
FIG. 3 is a graph illustrating an exemplary disclosed operation that may be performed by the hydraulic system of FIG. 2.

FIG. 3 illustrates an exemplary strategy used by controller 40 to regulate operation of hydraulic system 24 during a regeneration event. FIG. 3 will be discussed in the following section to further illustrate the disclosed system and its operation.

INDUSTRIAL APPLICABILITY

The disclosed hydraulic system may be applicable to any machine that includes a hydraulic actuator where fine modulation control and smooth response during a regeneration event are desired. The operation of hydraulic system 24 during an exemplary regeneration event will now be described.

During operation of power system 10, a machine operator may displace operator interface device 22 to indicate a desired movement of work tool 14. The displacement position of operator interface device 22 between the neutral and maximum displaced positions may relate to an operator expected or desired position, orientation, velocity, and/or force of work tool 14. Operator interface device 22 may generate the position signal corresponding to the displacement position, and send this position signal to controller 40.

Controller 40 may reference the position signal from operator interface device 22 with the relationship map(s) stored in the memory of controller 40 to determine appropriate velocity, pressure, and/or position commands for the operational one of head- or rod-end supply valves 32, 36 and the operational one of head- or rod-end drain valves 34, 38. Controller 40 may then command movement of the appropriate valves to regulate the flow rate and pressure of fluid flowing into and out of first and second chambers 56, 58, thereby causing movement of hydraulic actuator 30c that substantially matches the operator expected or desired movement.

During an extension regeneration event (resistive or overrunning), controller 40 may reference the map of FIG. 3 to determine the appropriate position commands directed to head- and rod-end supply and drain valves 32-38. The map of FIG. 3 shows three curves, including a first curve 100 associated with the position of head-end supply valve 32 between the first and second positions relative to a displacement position of operator interface device 22, a second curve 110 associated with the position of rod-end supply valve 36, and a third curve 120 associated with the position of rod-end drain valve 38. Head-end drain valve 34 may remain closed during an extension regeneration event. The shaded area of the map of FIG. 3 may be representative of the regeneration event.

As can be seen by reference to the map of FIG. 3, as operator interface device 22 is initially displaced away the neutral position (shown as 0% displacement in FIG. 3) toward the maximum displaced position (shown as 100% displacement in FIG. 3), only head-end supply and rod-end drain valves 32, 38 may be commanded to open. And, the opening amounts of head-end supply and rod-end drain valves 32, 38 may be directly related to the displacement position of operator interface device 22 (i.e., the opening rate of head-end supply and rod-end drain valves 32, 38 relative to the displacement position of operator interface device 22 may be generally linear). Thus, as operator interface device 22 is displaced to a greater extent, head-end supply and rod-end drain valves 32, 38 may open to a greater extent and pass more fluid, thus extending hydraulic actuator 30 at a greater velocity.

Regeneration may occur once the displacement of operator interface device 22 has increased to a first threshold amount. In one example, the first threshold amount may be about 25% of the displacement range of operator interface device 22. Once operator interface device 22 has been displaced to about 25% of its range, rod-end supply valve 36 may begin to open such that pressurized fluid exiting second chamber 58 may pass both to tank 26 and to first chamber 56 by way of head-end supply valve 32. And, as operator interface device 22 is displaced further, rod-end supply valve 36 may open to a greater extent in proportion to the displacement. In this manner, the pressurized fluid exiting second chamber 58 may be reused and the energy spent to pressurize that fluid may be at least partially conserved. During the initial stages of regeneration (i.e., during the initial opening of rod-end supply valve 36), rod-end supply valve 36 may still be opening to pass a greater amount of fluid to tank 26 in response to the greater displacement of operator interface device 22.

At about the same time that displacement of operator interface device 22 increases to about 25% of its displacement range (i.e., at about the time that rod-end supply valve 36 begins to open), the opening rates of head-end supply and rod-end drain valves 32, 38 may change. That is, for a displacement of operator interface device 22 greater than about 25%, the opening amount of head-end supply and rod-end drain valves 32, 38 relative to a displacement change of operator interface device 22 may increase.

When the displacement of operator interface device 22 increases to a second threshold amount, control of head-end supply and rod-end drain valves 32, 38 may be adjusted. In one example, the second threshold amount may be about 35% of the displacement range. When the displacement of operator interface device 22 increases to about 35% of its displacement range, the opening amount of head-end supply valve 32 may be fixed at an amount less than a maximum opening capacity. In one example, the fixed opening amount may be about 75% of a maximum opening capacity. At about the same time, the opening of rod-end drain valve 38 may peak at about half of a maximum opening position, and rod-end drain valve 38 may begin to close with further displacement of operator interface device 22. And, rod-end drain valve 38 may completely close before rod-end supply valve 36 is completely open.

The disclosed strategy may be utilized to gradually implement regeneration such that fine modulation control is maintained and operation of hydraulic system remains smooth. That is, because rod-end drain valve 38 may remain open and even may continue to open as rod-end supply valve 36 begins to open and redirect fluid for reuse, the regeneration event may begin gradually. This gradual initiation of regeneration may promote smooth operation. Further, because rod-end drain valve 38 gradually closes during the regeneration event, the smooth operation may be enhanced. And, because operation of these valves may be proportional to operator input, as opposed to on/off operation, fine modulation control may be maintained.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system, comprising:
   a tank configured to hold a supply of fluid;
   a pump configured to pressurize fluid;
   an actuator having a first chamber and a second chamber;
   a first valve fluidly connected between the pump and the first chamber;
   a second valve fluidly connected between the pump and the second chamber;
   a third valve fluidly connected between the second chamber and the tank;
   an operator input device displaceable from a neutral position to generate a signal indicative of a desired movement of the actuator; and
   a controller in communication with the first valve, the second valve, the third valve, and the operator input device, the controller being configured to:
      open the first and third valves by amounts related to the signal to pass fluid; and
      open the second valve by an amount related to the signal to pass fluid when the signal indicates a desire for increased actuator velocity, wherein the third valve continues to open during opening of the second valve.

2. The hydraulic system of claim 1, further including a fourth valve fluidly connected between the first chamber and the tank, wherein the fourth valve remains closed when the first valve is open.

3. The hydraulic system of claim 1, wherein the operator input device is displaceable within a range from the neutral position to a maximum position, and the second valve begins to open when a displacement of the operator input device increases to about 25% of the range.

4. The hydraulic system of claim 1, wherein the operator input device is displaceable within a range from the neutral position to a maximum position, and the third valve begins to close when a displacement of the operator input device increases to about 35% of the range.

5. The hydraulic system of claim 1, wherein the operator input device is displaceable within a range from the neutral position to a maximum position, and the first valve is fixed at a partially open position for any displacement of the operator input device greater than about 35% of the range.

6. The hydraulic system of claim 1, wherein an open position of the first valve becomes fixed before the third valve begins to close as a displacement of the operator input device increases.

7. The hydraulic system of claim 1, wherein the third valve closes completely before the second valve opens completely as a displacement of the operator input device increases.

8. The hydraulic system of claim 1, wherein an opening rate of each of the first and third valves is substantially linear and changes when the second valve begins to open as a displacement of the operator input device increases.

9. The hydraulic system of claim 1, wherein the third valve only opens about half as much as the second valve.

10. The hydraulic system of claim 1, wherein an opening amount of the first valve is greater than an opening amount of the third valve and less than an opening amount of the second valve.

11. The hydraulic system of claim 1, wherein the first and third valves open at about the same time to initiate operation of the actuator and close at different times during operation of the actuator.

12. A method of operating a hydraulic actuator, comprising:
    receiving a first operator input indicative of a desire to move the hydraulic actuator;
    directing pressurized fluid into a first chamber of the hydraulic actuator in response to the first operator input;
    directing fluid from a second chamber of the hydraulic actuator to a low pressure reservoir in response to the first operator input;
    receiving a second operator input indicative of a desire to move the hydraulic actuator at an increased velocity;
    increasing a rate of fluid flow into the first chamber and out of the second chamber to the low pressure reservoir in response to the second operator input; and
    directing fluid from the second chamber of the hydraulic actuator to the first chamber of the hydraulic actuator in response to the second operator input,
    wherein a flow rate of fluid being directed from the second chamber of the hydraulic actuator to the low pressure reservoir is increasing when fluid from the second chamber of the hydraulic actuator is being directed to the first chamber.

13. The method of claim 12, further including inhibiting fluid flow from the first chamber to the low pressure reservoir.

14. The method of claim 12, wherein the first and second operator inputs include a range from a minimum input value to a maximum input value, and fluid begins to flow from the second chamber to the first chamber when the second operator input increases to about 25% of the range.

15. The method of claim 12, wherein the first and second operator inputs include a range from a minimum input value to a maximum input value, and fluid flow from the second chamber to the low pressure reservoir begins to decrease when the second operator input increases to about 35% of the range.

16. The method of claim 12, wherein the first and second operator inputs include a range from a minimum input value to a maximum input value, and a flow of pressurized fluid into the first chamber becomes fixed at an amount less than a maximum capacity when the second operator input is greater than about 35% of the range.

17. The method of claim 12, wherein an amount of pressurized fluid flow into the first chamber becomes fixed before fluid flow from the second chamber to the low pressure reservoir reduces as a desired velocity of the hydraulic actuator increases.

18. The method of claim 12, wherein fluid flow from the second chamber to the low pressure reservoir stops completely before a rate of fluid flow from the second chamber to the first chamber achieves a maximum capacity as a desired velocity of the hydraulic actuator increases.

19. The method of claim 12, wherein the flow rates of fluid into the first chamber and out of the second chamber to the low pressure reservoir are substantially linear and change when fluid begins to flow from the second chamber to the first chamber as a desired velocity of the hydraulic actuator increases.

20. A power system, comprising:
    an engine;
    a frame configured to support the engine;
    a work tool operatively connected to the frame;
    a tank configured to hold a supply of fluid;
    a pump driven by the engine to pressurize fluid;
    a hydraulic cylinder connected to move the work tool and having a first chamber and a second chamber;
    a first valve fluidly connected between the pump and the first chamber;
    a second valve fluidly connected between the pump and the second chamber;
    a third valve fluidly connected between the second chamber and the tank;
    a fourth valve fluidly connected between the first chamber and the tank;
    an operator input device configured to generate a signal indicative of a displacement thereof away from a neutral position, the signal being related to a desired movement of the work tool; and
    a controller in communication with the first valve, the second valve, the third valve, the fourth valve, and the operator input device, the controller being configured to:
        open the first and third valves by amounts related to the signal during movement of the work tool in a first direction assisted by the pull of gravity when the signal indicates a displacement of the operator input device away from the neutral position; and
        open the second valve by an amount related to the signal during movement of the work tool in the first direction when the signal indicates an increased displacement of the operator input device away from the neutral position, wherein the third valve continues to open during opening of the second valve and the fourth valve remains closed during movement of the work tool in the first direction.

* * * * *